(12) United States Patent
Yie

(10) Patent No.: US 6,431,465 B1
(45) Date of Patent: Aug. 13, 2002

(54) ON-OFF VALVE AND APPARATUS FOR PERFORMING WORK

(75) Inventor: Gene G. Yie, Auburn, WA (US)

(73) Assignee: Jetec Company, Auburn, WA (US)

( * ) Notice: Subject to any disclaimer, the term of this patent is extended or adjusted under 35 U.S.C. 154(b) by 0 days.

(21) Appl. No.: 09/552,483

(22) Filed: Apr. 18, 2000

(51) Int. Cl.⁷ .......................... F02M 47/02; A62C 11/00
(52) U.S. Cl. ...................... 239/88; 239/533.15; 169/33
(58) Field of Search .............................. 239/88, 89, 91, 239/92, 93, 94, 533.1, 533.15; 169/33

(56) References Cited

U.S. PATENT DOCUMENTS

| | | |
|---|---|---|
| 4,555,872 A | 12/1985 | Yie |
| 4,765,540 A | 8/1988 | Yie |
| 4,768,709 A | 9/1988 | Yie |
| 4,862,911 A | 9/1989 | Yie |
| 5,117,872 A | 6/1992 | Yie |
| 5,186,393 A | 2/1993 | Yie |
| 5,241,986 A | 9/1993 | Yie |
| 5,297,777 A | 3/1994 | Yie |
| 5,524,821 A | 6/1996 | Yie |
| 5,794,854 A | 8/1998 | Yie |
| 5,799,688 A | 9/1998 | Yie |
| 5,879,137 A | 3/1999 | Yie |
| 5,927,329 A | 7/1999 | Yie |
| 6,179,574 B1 | 1/2001 | Yie |

Primary Examiner—William C. Doerrler
Assistant Examiner—Christopher S. Kim
(74) Attorney, Agent, or Firm—Pauley Petersen Kinne & Erickson

(57) ABSTRACT

An apparatus and process for generating a pulsed high-speed fluid jet that can be used to extinguish fires and/or to launch a projectile. A valve, such as an instant on-off valve, preferably operates in combination with a pressure accumulator. In a controlled manner, a pulsed fluid jet is generated and directed through a nozzle. The nozzle can draw into the fluid-jet an additive. The nozzle may also be used to launch a projectile using the fluid jet as a propellant.

23 Claims, 9 Drawing Sheets

ON-OFF VALVE AND APPARATUS FOR PERFORMING WORK

BACKGROUND OF THE INVENTION

1. Field of the Invention

This invention relates to an apparatus and process for delivering a pulsed fluid jet that can be used to extinguish a fire, launch a projectile and/or perform other useful work.

2. Description of Prior Art

It is a well known fact that rapidly extinguishing uncontrolled fires can be a very difficult task due to the complex nature of present day fires and the associated urgency of saving lives or minimizing economic loss and environmental damage. Many different types of fire occur today because of a presence of many man-made materials that combust with unusual characteristics and extinguishing such fire rapidly requires unusual approaches. Worldwide cities are now more crowded than ever and more people are living inside high-rise buildings which also contributes to the problem. And yet, the available fire-fighting technologies have not appreciably changed over the years and are known to be inadequate in many ways. There is a demanding need for improved fire extinguishing processes.

One most common process for extinguishing fires is to pour water over a burning object. The basic scientific principle involved in extinguishing fire with water is to reduce a temperature of the burning object as each combustible material has its unique flammability temperature. A flame can be extinguished if the temperature of the burning object is reduced below a threshold temperature by wetting and cooling the burning object with water. However, the flame can resume when the water is evaporated and the object is again raised above this flammability threshold temperature. There are many materials, such as plastics, that are not water absorbent and that combust at very high temperatures or that combust in vapor form; water has very limited usefulness in extinguishing a fire of such materials.

Current water-based fire fighting processes also have shortcomings because of the delivery method. As a fluid, water flows down due to gravity such that its contact time with materials in a vertical, flowing downward, and inclined position is usually very short unless the spray is continuously applied over a period of time. The water spray is also often not powerful enough to travel a long distance, to reach a considerable height, or to break through common barriers such as windows, doors, roofs, and walls. In many cases, most of the water flows downward and is wasted. A good example is forest and bush fires in which a long contact time between the water and the burning branches is literally impossible to maintain, except by rain. Extinguishing common house fires within a house can be troublesome because of difficulties with pouring water into a house interior and onto burning surfaces. Fire can exist between the exterior walls and the interior walls or on ceilings, where water cannot be easily delivered into such space and onto such surfaces. As a result, much of the water consumed in fighting house fires causes water damage to the extent that even if a house is saved it is frequently damaged beyond repair.

A fire which occurs in a high-rise building is also a difficult fire to extinguish because of the difficulty in reaching the fire with water. Common sprinkler systems can be ineffective for various reasons. Likewise, fire which occurs at locations where water is scarce, or where fire equipment cannot be transported to the site, can be a problem where effective portable fire extinguishing equipment is unavailable. There are many other examples of ineffective currently available water-based fire fighting processes. Fires on oil storage tanks and on oceangoing oil tankers are very difficult to extinguish with conventional water processes. Airplane fires are another example of difficult fires to extinguish because of the presence of jet fuels and the large quantity of plastics materials. In some unusual cases, the water consumed in fighting fire can result in very severe environmental damage if it is not properly contained, as evidenced years ago in a fire that occurred in a chemical plant in Switzerland, in which the fire fighting water dissolved a large quantity of toxic chemicals and then flowed into the Rhine River and severely impacted the ecosystem of the Rhine River.

Since water is ineffective against certain types of fire and under certain conditions, more effective fire retardants have been developed and made available in various forms and packages over the years. These fire retardants, when released from their containers, can be in the form of a powder, a foam, or a liquid. They function in different ways and therefore should be used differently. Some produce inert gas such as carbon dioxide and nitrogen when they are heated, thus suffocating the fire; examples include sodium bicarbonate and azodicarbonamide. Others produce vapors that act as diluent and heat sinker to combusting gases or as a free radical trap that stops or slows flame propagation; examples include halogenated flame retardants. Still other fire retardants function on solid phase by forming a protective layer on combusting substances to inhibit heat transfer; examples include many phosphorous compounds. Then there are many common materials that are very effective fire retardant when they are spread over a burning object by isolating the burning object from the ambient air; examples include many earth minerals such as clay, alumina, and sand. These earth minerals are particularly effective when they are wet and impervious. There are also materials that are very absorbent to water and can swell to form a gel that can be very useful for extinguishing fires by acting as a wet blanket; examples include polyacrylamide polymers and copolymers, and some natural gums. All these materials have some very useful features that can be used to fight fires.

Unfortunately, the currently available processes involving the use of various fire retardants have a common shortcoming, namely poor delivery distance, accuracy, and coverage. For example, powders and foams are very light and they cannot be pumped easily or blown in air over a distance with any accuracy. Once delivered, powder and foam may have difficulty remaining on top of a burning object. For example, powder fire retardants are currently used to fight forest fires and are dropped from an airplane, with questionable effectiveness. Hand-operated fire extinguishers are effective only on small fires and in confined space because of limited delivery distance and light weight characteristics of the retardants. Sand is a good fire retardant, but there is no good way to throw sand over a distance. The currently available fire extinguishing processes based on fire retardants are also not powerful enough for breaking through barriers to reach interior fires. For example, the current practice of fighting ship fires is to spray water on the ship until it is virtually sunk. Therefore, to take advantage of the positive features of available fire retardants requires a more effective retardant delivery method. Further, a synergistic approach must be adopted to combine one or more materials to fight fires. For example, water can be used in conjunction with another fire retardant to create a slurry that can smear and stick to burning surfaces like a wet blanket rather than merely touch it which then flows downward.

SUMMARY OF THE INVENTION

One object of this invention is to provide an improved fire extinguishing process that combines the positive features of water and selected fire retardants with other suitable materials and devices to form a combination that can more effectively fight various types of fire, under a wide range of conditions.

Another object of this invention is to provide a process and apparatus that are useful for performing many other work tasks.

Another object of this invention is to provide an improved process and apparatus for extinguishing fire of many types.

Another object of this invention is to provide a process that uses a high-speed pulsed waterjet or other fluid jet to extinguish fires either by the fluid jet alone or in combination with selected fire retardants in various forms.

Another object of this invention is to provide an instant on-off valve useful in many fluid jet processes.

Still another object of this invention is to incorporate other selected materials or devices into the process to assist delivery of pulsed fluid jets and/or selected fire retardants and/or other materials that are useful in many other applications.

The process of this invention uses pressurization of a selected system fluid by a suitable pump or a source of compressed gas that is used to pressurize a system fluid inside a cylinder. The pressurized fluid is transported with a tube or hose into one or more energy storage devices in the form of a spring-powered or a gas-powered accumulator. The system fluid is stored inside an energy accumulator fluid chamber to a prescribed volume. The stored system fluid is ejected or discharged through one or more suitable instant on-off valves and nozzles to generate high-speed fluid jets on demand, and directing and delivering the fluid jet to a target. The selected system fluid can be water or other fluids, such as a pure liquid, an emulsion, a slurry, or a soft gel. The pump can be large or small, low pressure or high pressure, depending on the desired characteristics of the fluid jet. The pulsed fluid jet of this invention can be generated at a wide range of pressures, power input, frequency, and pulse durations by operating the energy accumulators and the on-off valves. The system equipment involved can be large and heavy, which of ten require mounting on a suitable chassis or carriage, or can be very portable that can be carried by a person, such as on a backpack. There can be multiple energy accumulators to a single pump, multiple on-off valves to a single energy accumulator, or multiple nozzles to a single on-off valve. The on-off valve used in this process is one important part of this invention. The nozzles on this process can be a simple fluid jet nozzle commonly used in water jetting applications or a compound nozzle that has components for introducing other substances into the fluid jet or to assist a fluid jet, such as during flight in air. The nozzles of the process of this invention may also be attached with a source of optical light or laser light, for the purpose of illuminating the fluid jet.

The process of this invention also uses a fluid jet to carry selected additives to assist extinguishing fire or doing other work. The additives can be added to the fluid prior to pressurization to form a mixture, a colloid, a soft gel, or a slurry and then introduced into the system equipment and eventually discharged or ejected out of the nozzle as a pulsed fluid jet. In an alternative embodiment of this invention, selected additives are introduced into the pulsed fluid jet in the nozzle chamber by utilizing a venturi effect generated by the fluid jet, or by loading the additives into the nozzle chamber by gravity, by pressure, or by other suitable mechanical means. The additives are preferably formed as a liquid, a slurry, a soft gel, a powder, or pellets that can be introduced into the fluid jet nozzle, preferably in a simple manner. In one embodiment of the pulsed fluid jet process of this invention, selected additives are time loaded into a nozzle chamber prior to issuing a pulsed jet. The fluid jet passes through the nozzle chamber and carries additives through a secondary nozzle to be shaped into a high-speed slurry jet. Thus, in this process there is proper energy transfer from the fluid jet to the additives. Such energy transfer is not proper or possible with a setup that uses continuous fluid jet. In fighting fires, the fluid jet of this invention can act as a carrier for the additives.

The process of this invention also use a special-effect device that is introduced into or onto the nozzle and ejected with or propelled by the pulsed fluid jet, for various suitable purposes. This device may be in the form of a ball, a bullet, a cap, a capsule, a cartridge, a shell, a tube or the like. This added device can be for shielding the pulsed fluid jet and/or the additives against the air during flight so that the fluid jet can travel much further, particularly with less dispersion. The added device can be packed with fire retardants and can be used or manufactured with fire retardants, to play an active role in fighting fires when propelled into a fire by the pulsed fluid jet. The added device of this invention can also be used as a piercing tool, allowing the retardants to be delivered into a closed space, such as a house, by breaking through barriers. The added device of this invention can also be installed with a valve or another material-releasing mechanism to perform special effects, such as releasing fire retardants to cover a large area.

The pulsed fluid jet of this invention is an ideal tool for propelling fire retardants because of the following reasons.

Water or another suitable liquid alone is or can be made to be an effective fire retardant. For example, carbon tetrachloride is a non-conductive and non-flammable liquid that can be useful in fighting an electrical fire, particularly when it is used in conjunction with conventional Halon powder. Water can be converted into a sticky soft gel with various additives such that it will smear a surface instead of flowing quickly down the surface.

Water or another suitable liquid can be pressurized to a high level and ejected or discharged through a nozzle to generate a pulsed jet that can be very fast and can pack considerable power which is particularly suitable for carrying additives. Air or gases, in contrast, cannot be used to generate a very fast jet and cannot be readily pressurized, due to its compressible nature.

Liquid having a specific gravity not too different from that of solid fire retardants allows a pulsed liquid jet to transfer energy more effectively to additives when compared to an air jet or a gas jet.

Waters and other selected liquid jets do not generate much heat in repeated operations and thus do not interfere with fire retardants. Explosives, on the other hand, cannot be used to propel many fire retardants due to the heat generated inside a tube, and the heat can set off the fire retardants.

The process of this invention also includes the use of a light source, such as laser light or other suitable optical lights, to illuminate a pulsed fluid jet issued from the nozzle for various purposes.

The process of this invention can be used also for delivering selected materials for other purposes, such as agricultural, environmental, and construction applications. For example, seeds, fertilizers, insecticides, and bioremediation reagents can be delivered effectively with the process and equipment of this invention. Soil stabilization materials can be blown over or injected into earth embankment, slopes, and ground with the process of this invention. Even seedlings can be propelled by pulsed fluid jet according to the process of this invention, and planted over a distance by using special capsules.

BRIEF DESCRIPTION OF THE DRAWINGS

The features of the apparatus and process according to this invention will be better understood when taken in view of the drawings, wherein.

DETAILED DESCRIPTION OF PREFERRED EMBODIMENTS

Figure 1:
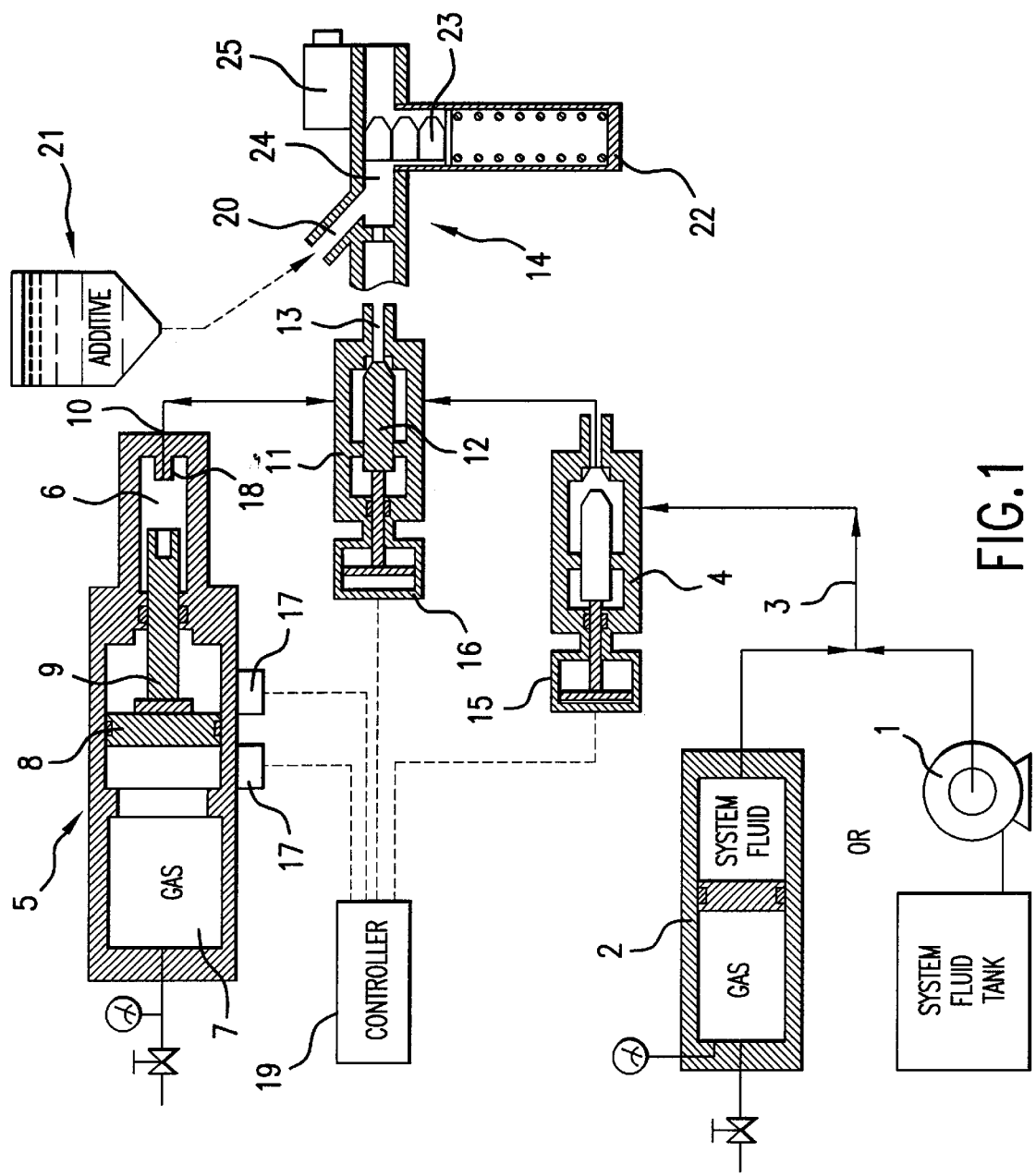
FIG. 1 is a schematic view of an apparatus or a system for generating a pulsed fluid-jet, according to one preferred embodiment of this invention.

Referring to FIG. 1, one embodiment of this invention concerns a process for generating a pulsed fluid jet such as one that is useful for extinguishing fires and for many other tasks. The fluid can be water or any other suitable fluid, including slurries. The fluid is pressurized either by pump 1 that is powered by a motor or engine, or by a gas powered piston inside cylinder 2, and is transported by a conduit, such as a tube or hose 3 through control valve 4 to accumulator 5. Accumulator 5 is preferably, but not necessarily a cylindrical device having fluid chamber 6 and gas chamber 7 which is separated by piston 8 or straddled by piston-plunger assembly or plunger 9 that can slide within the chambers. Gas chamber 7 is filled with a pressurized gas, such as air or nitrogen, to a prescribed precharge pressure. Fluid chamber 6 is normally occupied by plunger 9. When the pressurized system fluid enters into fluid chamber 6, it forces plunger 9 against piston 8 to further compress the gas and to fill fluid chamber 6. Fluid chamber 6 has outlet 10 leading to on-off valve 11 that is normally closed by valve poppet 12. Valve 11 has outlet port 13 leading to fluid jet nozzle 14.

In one preferred embodiment of this invention, valve 4 is an on-off valve comprising actuator 15 that can be operated by electrical, compressed air, hydraulic oil, or manual trigger power. Valve 11 comprises actuator 16 that is powered by electrical, compressed air, hydraulic fluid, or manual trigger power. When valve 4 is open and valve 11 is closed, the pressurized system fluid flows into fluid chamber 6 of the energy accumulator 5 and is stored there to a predetermined capacity. As a result, piston 8 inside gas chamber 7 is moved to compress the gas to a higher pressure, thus storing the energy. One or more piston position sensors 17 can be mounted inside or outside the cylinder of accumulator 5, for example to monitor the exact location of piston 8 and to inform the controller if valve 11 should be opened. When valve 11 suddenly opens and valve 4 closes, the pressurized fluid inside fluid chamber 6 flows out valve port 13 and nozzle 14 to generate a high-speed fluid jet until fluid chamber 6 is emptied as plunger 9 pushes all fluid out of outlet 10. Plunger cushion 18 which is preferably mounted inside fluid chamber 6 provides a fluid cushion to decelerate plunger 9. Then, valve 11 closes and valve 4 opens to start another cycle. The presence of multiple piston position sensors 17 permits the variation of pulsejet duration and frequency. The valve operation can be handled manually or by means of controller 19. On-off valve 4 protects pump 1 and can be omitted in some applications and the fluid will flow directly from the source to the energy accumulator 5 without interruption. Nozzle 14 of this invention can be a simple fluid nozzle or a complex nozzle, such as shown in FIG. 1, comprising additive inlet 20 for introducing to the fluid jet selected additives from storage hopper 21, magazine 22 for storing and introducing special-effect devices 23 into nozzle chamber 24, and/or a source of laser or optical light 25 attached to or near nozzle 14.

In one preferred embodiment of this invention, the system fluid is water or a water-based liquid mixture, a soft gel, or a slurry. However, in other preferred embodiments the fluid is ethylene glycol, carbon tetrachloride, or other fluids that possess special properties advantageous to the applications. In large systems, the system fluid can be pressurized by suitable pumps and the valves operated with a controller. In portable systems, the system fluid can be pressurized with a manual pump or stored inside a cylinder that is pressurized by compressed air or gas and the valves can be operated by hand. The system fluid can be pressurized to a modest level of less than one hundred pounds per square inch (psi) or to tens of thousand psi, depending on the intended application. For systems operating at a modest pressure, accumulator 5 can comprise a simple cylinder having piston 8 inside for separating the system fluid from the compressed gas. In high-pressure systems, accumulator 5 is preferably constructed as a pressure vessel and has gas piston 8 and an attached fluid plunger 9; the diameter of piston 8 and plunger 9 is of a prescribed ratio, which determines a force relationship across the two components. The force generated by the system fluid inside fluid chamber 6 needs to overcome the force exerted on piston 8 by the compressed gas, in order to move piston 8 and to store the fluid energy. When valve 11 opens, the fluid jet is powered by the compressed gas pushing against piston 8 and plunger 9 and thus has power instantly and the power is continued until fluid chamber 6 is emptied and valve 11 closes. By manipulating or varying design and/or operating parameters of valves 4 and 11 and accumulator 5, the pulsed fluid jet can vary in pulse duration and frequency. If pump 1 has variable pressure and flow control, then the power of the pulsed fluid jet can be varied as well.

Figure 2B:
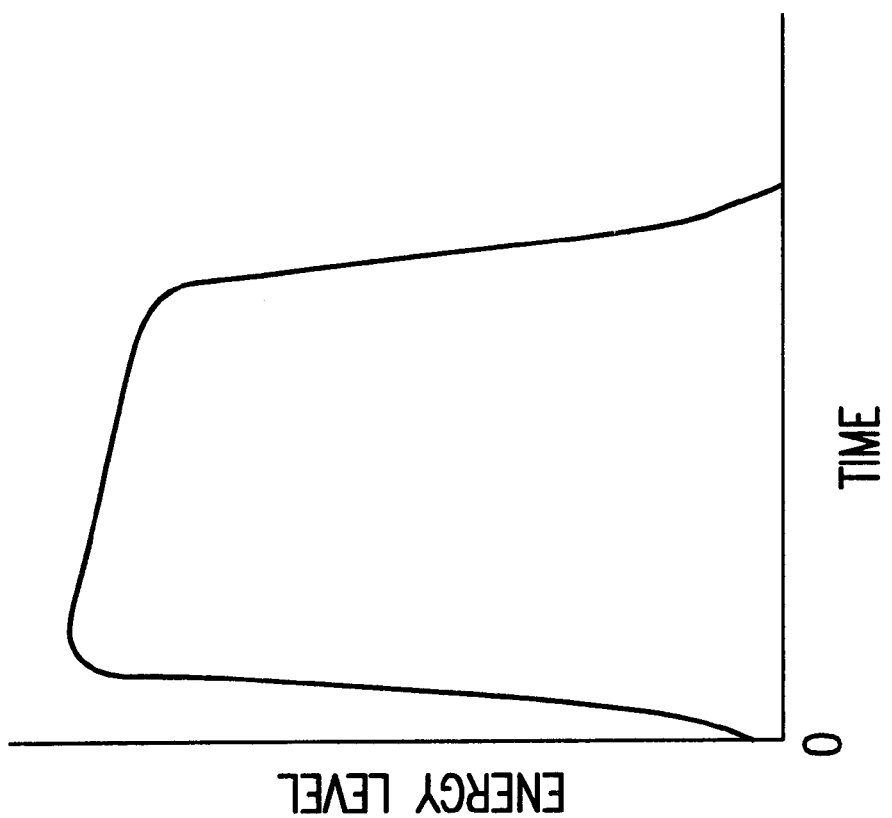
FIG. 2B is a graph showing energy level versus time as related to the power of one preferred embodiment of this invention.
Figure 2A:
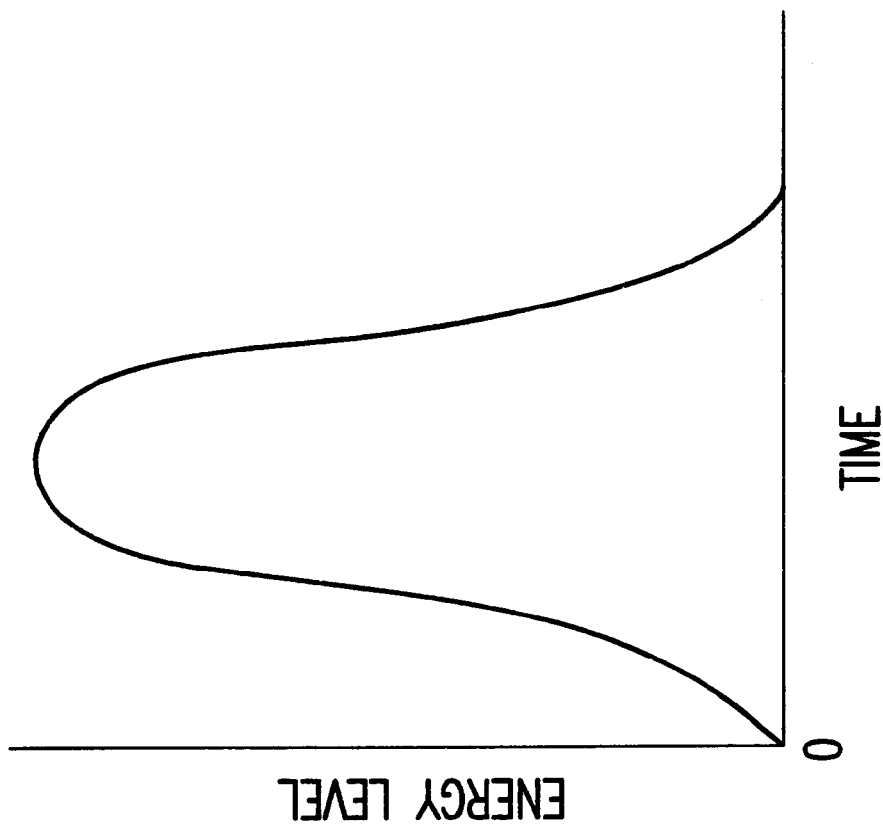
FIG. 2A is a graph showing an energy level versus time as related to the power according to a conventional pulsed fluid jet process.

For the pulsed fluid jet of this invention to function properly, it should have instant power and its power vs. time profile should follow a step curve rather than a bell curve, as shown in FIGS. 2A and 2B. In a bell-shaped curve profile as shown in FIG. 2A, the pulsed fluid jet would have fluid dripping at the beginning and end of a pulse due to a lack of energy. The dripping fluid does no work and is wasted. In a step-shaped curve profile as shown in FIG. 2B, the pulsed fluid jet, on the other hand, has instant power at the beginning of a pulse and plentiful power at the end of a pulse, thus wasting no fluid power. To produce such fluid jet pulse requires a suitable valve that provides instant on-off operations with a reasonably large outlet and with a fluid passage that is free of flow obstacles. Otherwise, a significant pressure drop and flow turbulence can occur which prevents the formation of a coherent high-speed fluid jet. In one preferred embodiment of this invention, an instant on-off valve is ideally suited for this process.

Figure 3:
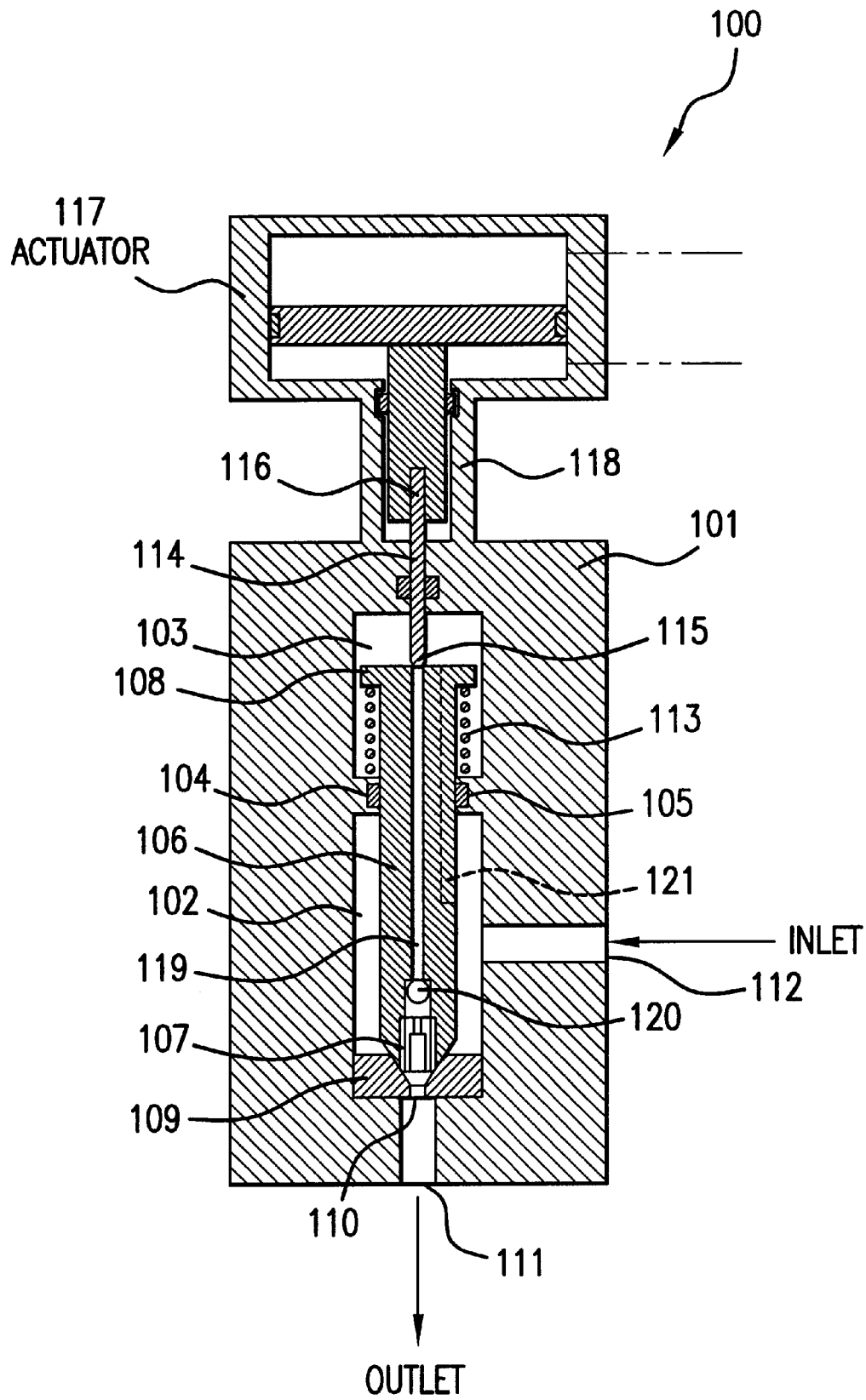
FIG. 3 is a cross-sectional view of an on-off valve, according to one preferred embodiment of this invention.

Referring to FIG. 3, instant on-off valve 100 of this invention comprises valve body 101 having central in-line cylindrical cavities 102 and 103 separated by partition 104 and seal 105. Valve plunger 106 straddles across partition 104 and has front end 107 in chamber 102 and rear end 108 in chamber 103. Valve seat 109 comprises a central valve port 110 shaped to mate with plunger front end 107 and in communication with valve outlet 111. Valve inlet 112 passes through valve body 101 in communication with chamber 102. Compression spring 113 around valve plunger 106 urges valve plunger 106 to move away from valve seat 109. Valve actuating pin 114 has internal end 115 positioned inside chamber 103 and external end 116 positioned outside valve body 101. Valve actuator 117 is attached to valve body 101 through adapter 118. Valve plunger 106 has central through fluid passage 119, check valve assembly 120 in line with fluid passage 119 that allows fluid to flow only from rear end 108 to front end 107, and a smaller side fluid passage 121 linking chamber 102 to chamber 103. Fluid passage 119 is in line with valve actuating pin 114 and can be closed or opened by internal end 115 of actuating pin 114. Valve actuator 117 provides a necessary force to external end 116 of actuating pin 114, directly or indirectly.

Still referring to FIG. 3, valve 100 in a normally-closed mode has an external force from valve actuator 117 pushing against actuating pin 114, which in turn engages fluid passage 119 and pushes valve plunger 106 down to close valve port 110. As pressurized fluid enters into valve chamber 102, it is stopped by valve plunger 106 and a portion of this fluid flows through fluid passage 121 and fills chamber 103, thus exerting force on plunger end 108 to close valve port 110. In the meantime, the fluid force inside chamber 102 urges valve plunger 106 to part from valve seat 109 is comparably smaller due to the conical mating surface between plunger front end 107 and valve seat 109, such that the fluid does not contact the central portion of valve plunger front end 107.

To open valve 100, actuator 117 is activated to allow actuating pin 114 to move away from chamber 103 and to expose fluid passage 119, thus allowing pressurized fluid inside chamber 103 to flow through fluid passage 119 and into valve outlet 111. As a result, the fluid force on plunger end 108 ceases and the fluid force inside chamber 102 pushes valve plunger 106 upward to expose valve port 110. Being relatively smaller, fluid passage 121 delays the pressure equalization of chambers 102 and 103, and check valve assembly 120 blocks the reverse flow of fluid from chamber 102 to chamber 103, thus assuring that valve plunger 106 rapidly moves all the way up. Compression spring 113 also helps the upward motion of valve plunger 106 and keeps it at its highest position. Without check valve assembly 120, valve plunger 106 may move up only part the way and then stop as the fluid pressure in chambers 102 and 103 equalizes, unless a powerful compression spring 113 is used to overcome seal friction around valve plunger 106. In some embodiments of this invention, such powerful spring is not desired inside valve 100. In normally-open mode of operation, valve 100 is identical except that actuator pin 114 is normally in disengaged position and the system fluid flows freely through valve 100. To close valve 100, actuator 117 is powered to push actuating pin 114 against valve plunger 106 and to close valve port 110. Actuator 117 can have a piston-and-rod arrangement to provide the necessary force and can be powered by compressed air or gas and by pressurized oil. Actuator 117 can also be an electrical solenoid capable of push-pull operations. Actuator 117 can also be manually operated in which the required valve closing or opening force is provided either by a compression spring or by a hand-operated lever working against the spring.

Figure 4:
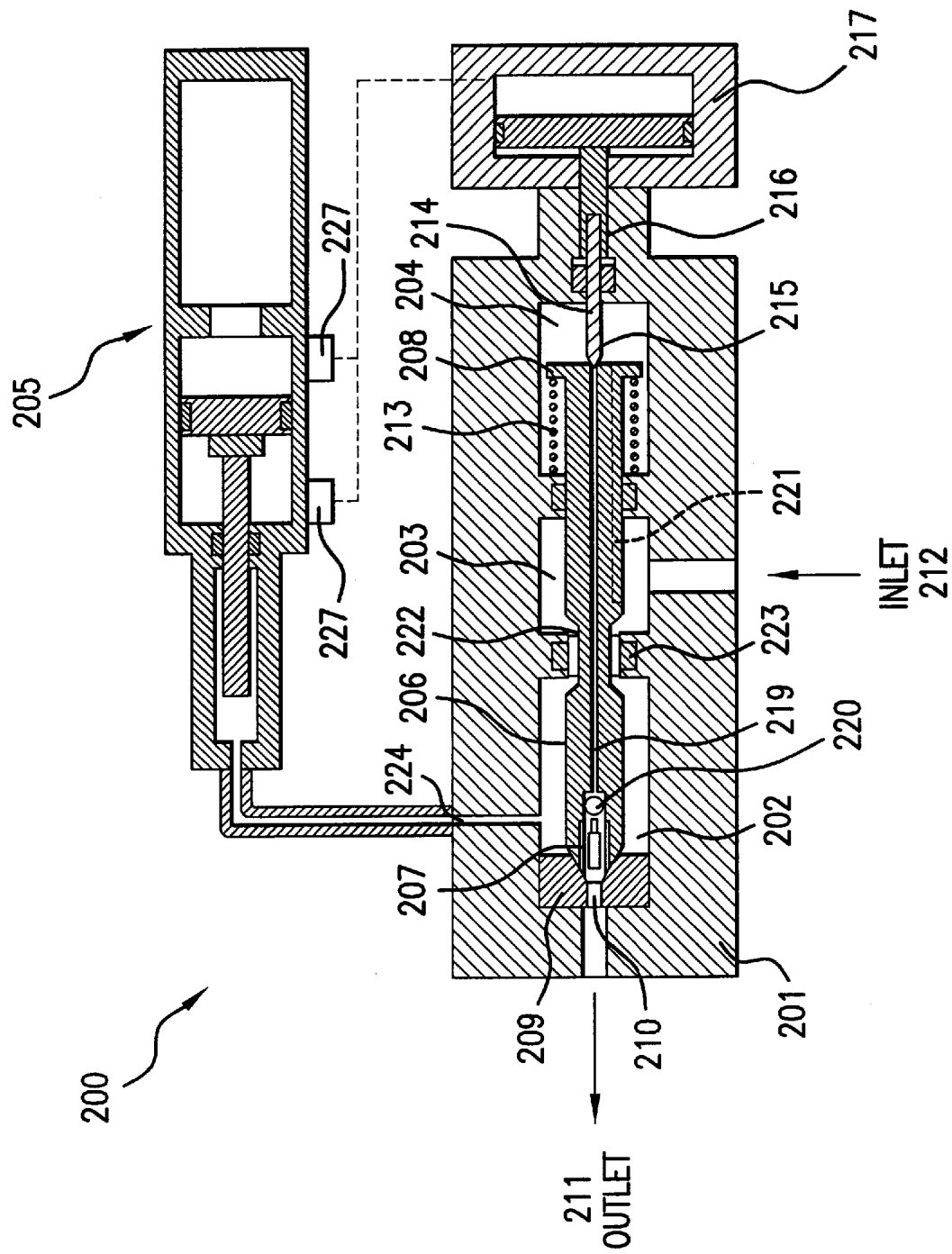
FIG. 4 is a cross-sectional view of a combination actuator and on-off valve, according to another preferred embodiment of this invention.

Referring to FIG. 4, another instant on-off valve 200 of this invention comprises valve plunger 206 that serves dual purposes. Valve 200 comprises valve body 201 having three in line cylindrical chambers 202, 203 and 204, separated by partitions and seals. Valve plunger 206 straddles across the three chambers 202, 203 and 204 and has front end 207 in chamber 202 and rear end 208 in chamber 204. Valve seat 209 has valve port 210 in communication with valve outlet 211. Valve inlet 212 passes through valve body 201 and is in communication with chamber 203. Compression spring 213 around valve plunger 206 urges it to move away from valve seat 209. Valve actuating pin 214 is in line with valve plunger 206 and has internal end 215 inside chamber 204 and external end 216 outside valve body 201 and in contact with valve actuator 217. Side valve port 224 is in communication with chamber 202 to an external accumulator 205. Valve plunger 206 has a central through fluid passage 219 with check valve assembly 220 near valve plunger front end 207. A smaller side fluid passage 221 of valve plunger 206 is in communication with chambers 203 and 204. Cutout area 222 around the middle portion of valve plunger 206 straddles across seal assembly 223. The cutout area 222 serves as fluid passage from chamber 203 to chamber 202, with a function similar to that taught in U.S. Pat. No. 5,297,777.

Still referring to FIG. 4, valve 200 of this invention combines two valves in one and represents the combination of valve 4 and valve 11 as shown in FIG. 1. In normally-closed operation, valve 200 is closed and the system fluid flows through inlet 212, chamber 203, cutout area 222, chamber 202, valve port 224, and into the fluid chamber of energy accumulator 205 and is stored there. In this closed position, cutout area 222 of valve plunger 206 is positioned across seal 223, thus allowing the fluid to pass through cutout area 222. When actuator 217 is energized to retract valve actuating pin 214, valve plunger 206 moves away from valve seat 209 to open valve port 210 so that cutout area 222 moves to the right, as shown in FIG. 4, of seal 223 and into chamber 203, thus preventing fluid flow from chamber 203 to chamber 202. In the meantime, valve port 210 opens and the fluid stored inside accumulator 205 flows into chamber 202 and out of valve outlet 211 until the fluid chamber of accumulator 205 is emptied and valve 200 is closed again. Valve 200 allows separation of fluid flow so that clean pulsed fluid jets can be produced and the pump function not disturbed. If piston position sensor 227 is mounted on accumulator 205 and is connected to actuator 217, valve 200 can be operated on an automatic repeat mode so that it will open as soon as the fluid chamber of accumulator 205 is filled to a prescribed volume and closes when the fluid chamber is empty.

Figure 5A:
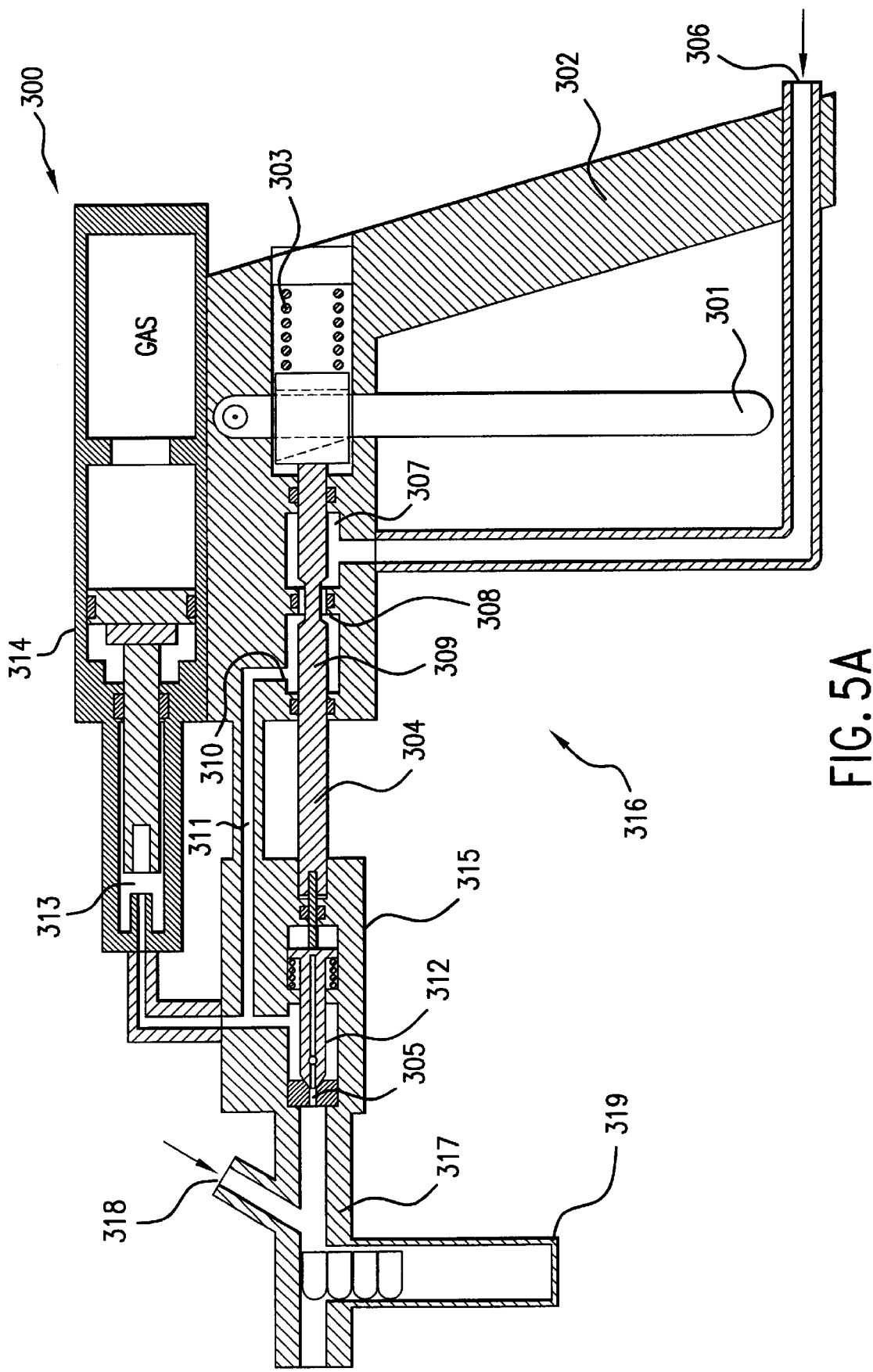
FIG. 5A is a cross-sectional view of a manually-operated actuator and on-off valve, according to another preferred embodiment of this invention.
Figure 5B:
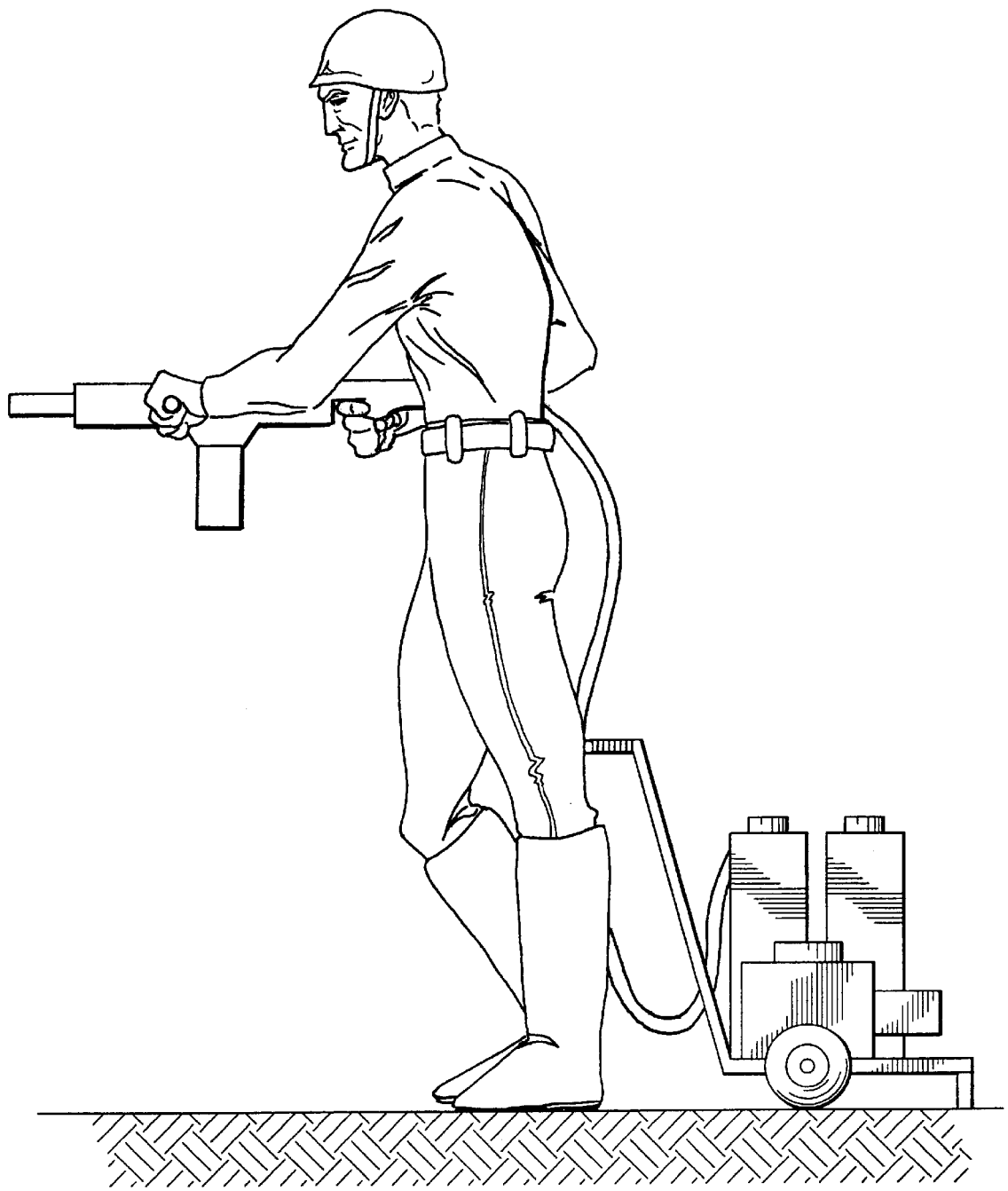
FIG. 5B is a schematic view of a portable manually-operated apparatus, according to one preferred embodiment of this invention.

The pulsed fluid jet process of this invention can be applied with a portable and manually-operated apparatus, such as shown in FIGS. 5A and 5B. The apparatus of this invention combines a relatively small energy accumulator with a manually-operated dual-function valve and a nozzle to form a complete pulsejet applicator 300. With applicator 300 in a normally-closed position, hand lever 301 is pulled toward handle 302 to compress valve-actuating spring 303 and to move valve plunger 304 to open valve port 305. When hand lever 301 is released and applicator 300 is closed, a pressurized system fluid flows from a pump or a pressurized tank through a hose to inlet 306 of applicator 300. From inlet 306, the fluid flows into valve chamber 307, through cutout area 308 of valve plunger 304, valve chamber 309, side port 310, fluid passage 311, and into valve chamber 312 and fluid chamber 313 of energy accumulator 314, which can be a separate unit or conveniently attached to the valves. Applicator 300 can have two valves, and front pulsejet valve 315 that controls valve port 305 in a way similar to valve 100 shown in FIG. 3, and rear valve 316 controls the inflow of system fluid to the energy accumulator. Together, valves 315 and 316 function as valve 200 shown in FIG. 4. Applicator 300 has nozzle 317 in line with valve port 305. Nozzle 317 can be a conventional fluid-jet nozzle employed in water jetting applications, or a complex fluid-jet nozzle having additive inlet 318 and detachable capsule magazine 319 for special-effect devices. Applicator 300 can provide a very compact hand-held pulsejet generator which can be used with a compact pump system or a pressurized fluid supply system.

Figure 6:
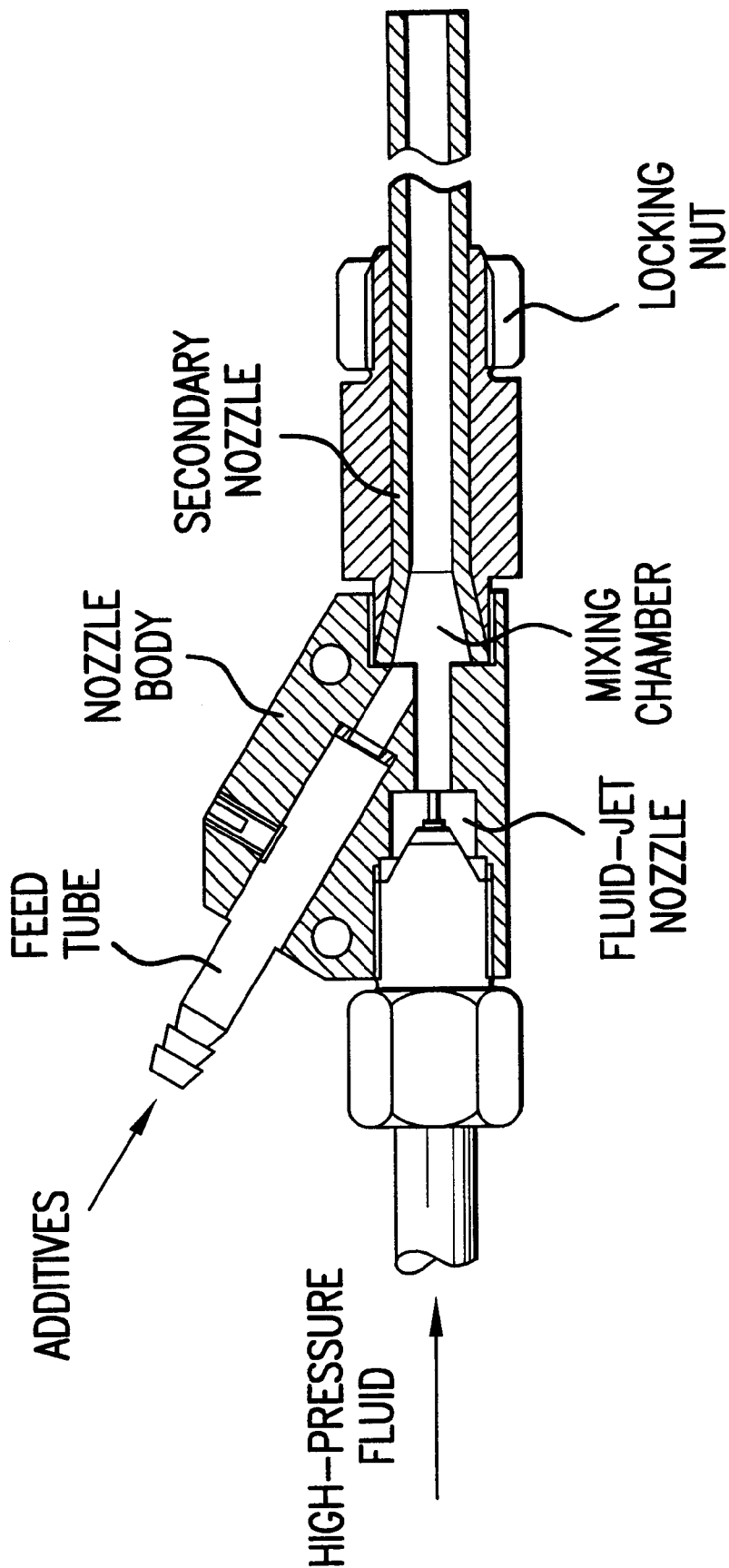
FIG. 6 is a cross-sectional view of a conventional venturi-effect fluid-jet nozzle, according to the prior art.

When used in fighting fires, the system fluid such as water can be stored in a pressurized cylinder and can be carried on a backpack or on a small cart, and the selected fire retardants can be prepared in capsules and packed in magazines to be delivered by the pulsejets, or stored in another cylinder and delivered into the nozzle via a conduit, such as a hose. A venturi-effect fluid-jet nozzle allows energy to be transferred from the pulsejet to the additives and ejected together through a secondary nozzle. A suitable nozzle is taught by U.S. Pat. No. 4,666,083, and is illustrated in FIG. 6 of this invention. As shown in FIG. 6, this nozzle assembly has a high-pressure fluid-jet nozzle on the left and a secondary slurry nozzle on the right and therebetween a mixing chamber. The selected additives enter the mixing chamber through a feed tube in a side port and are often drawn or sucked into the nozzle by a vacuum generated by the very high speed fluid jet. The cited prior art taught the use of multiple orifices strategically positioned to provide superior energy transfer from the fluid jets to the additives and to generate a high-speed slurry jet. This prior art nozzle can be advantageously used in this invention.

Figure 7:
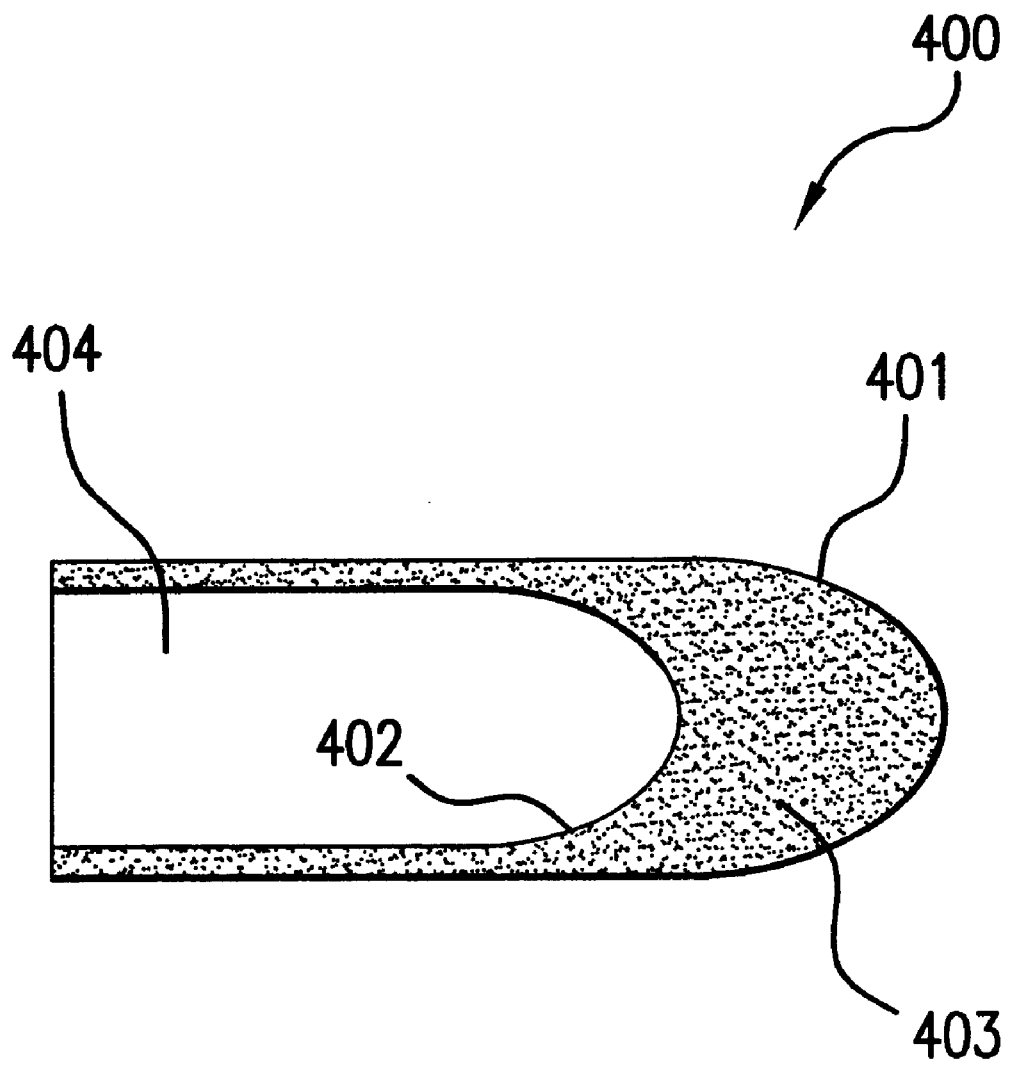
FIG. 7 is a cross-sectional view of a capsule or projectile, according to one preferred embodiment of this invention.

The process of this invention also includes the use of a pulsed fluid jet to propel a selected object placed inside or outside a nozzle for various purposes. This object can be in many forms such as balls, bullets, caps, capsules, cartridges, cups, shells, and tubes, and is preferably loaded into a nozzle cavity by various means such as gravity, spring force, pneumatic power, mechanical means, or manual loading. The objects can be soft or hard, and made of various materials. FIG. 7 shows one preferred embodiment of the object wherein capsule 400 of this invention is shaped like a hollow bullet having an outer surface 401, inner surface 402, front head 403, and interior cavity 404. Capsule 400 can be molded from selected powder, formed from a gel, or can have an outer skin and an inner skin with other materials in between a powder and a gel. When the process of this invention is used to fight fires, capsule 400 can be made of fire retardants and be ejected out of a nozzle by a pulsed waterjet. Capsule 400 can deflect air resistance during flight and actively participate in extinguishing the fire. When capsule 400 is made of water absorbing polymers such as polyacrylamide, a pulsed waterjet swells the capsule further upon contact and together can be effective in blanketing a fire. Capsule 400 can be formed in so many ways such that they can be coded for use against fire of various types and under various conditions.

Figure 8:
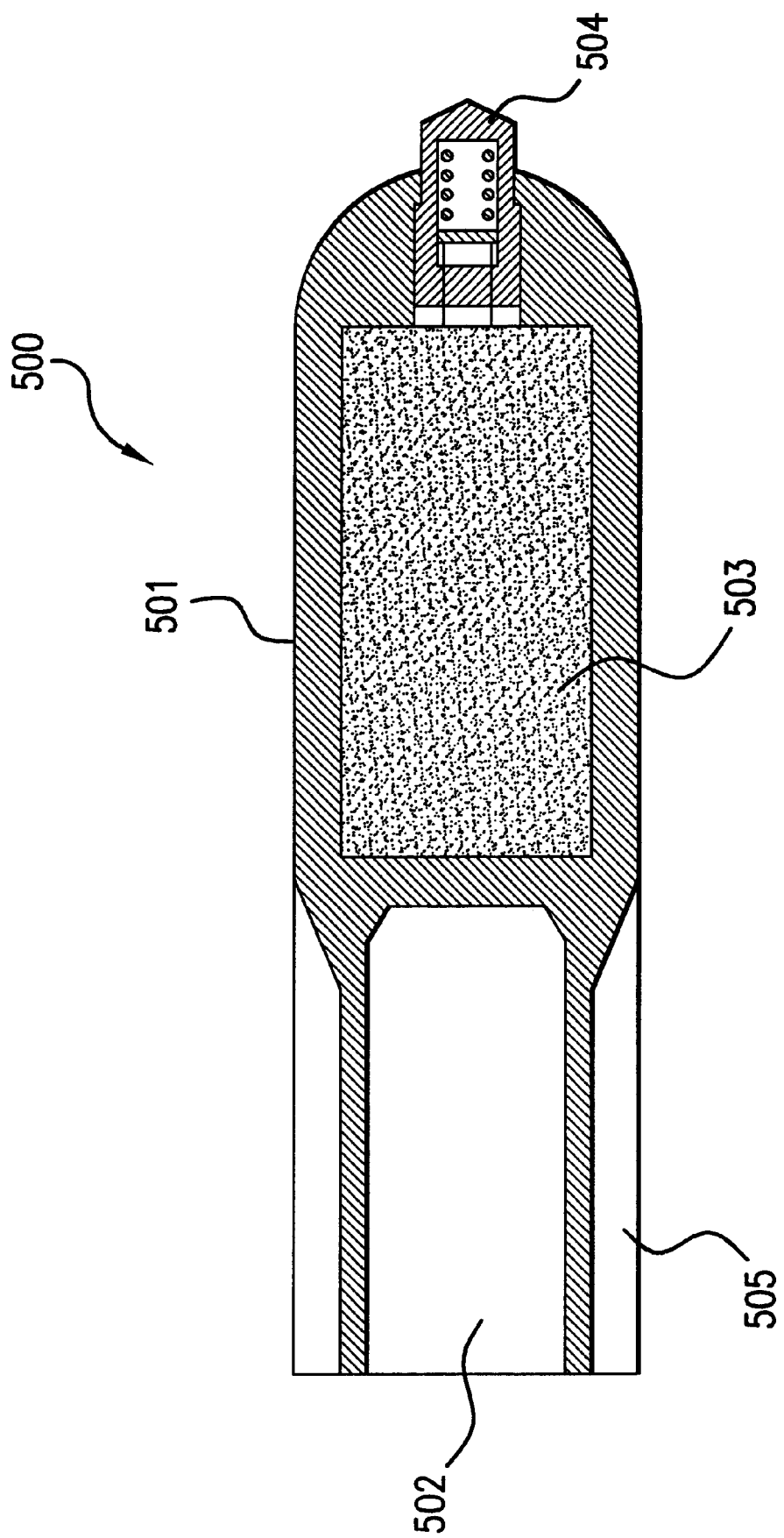
FIG. 8 is a cross-sectional view of a capsule or projectile, according to another preferred embodiment of this invention.

A pulsed fluid jet of this invention can generate so much force that capsule 400 can be made into a shell or bomb and shot or lopped into a fire by a pulsed fluid jet. Referring to FIG. 8, one embodiment of this invention is a fire-extinguishing shell 500 that has a cylindrical body 501 made of metal, glass, ceramic, or a hard plastic that can be propelled by a pulsejet of this invention. Shell 500 comprises rear cavity 502 for accepting a pulsed fluid jet, front cavity 503 containing liquid carbon dioxide or liquid carbon dioxide and other selected fire retardants, front impact valve 504 for releasing the contents of cavity 503, and stabilizing fins 505 for improved air flight. Shell 500 is preferably loaded inside a cylindrical cavity in a pulsejet nozzle of this invention and is to be propelled by one pulsejet. Impact valve 504 opens rapidly upon impact, to release the fire retardants. Shell 500 can be made in various sizes and with different specialties to tackle fires of different natures. Shell 500 can also be made with very hard metal, so that it can pierce through barriers such as steel plate and deliver the fire retardants to the interior of vessels and tanks. Such capabilities are also very useful in fighting fire in high-rise buildings with a system mounted on a helicopter.

Referring back to FIG. 1, the apparatus of this invention may comprise more than one energy accumulator for each pump system to handle high flow of a system fluid, so that the flow is almost continuous. There can be multiple nozzle assemblies operating at a high frequency for each energy accumulator to deliver a large quantity of system fluid and additives to a target. Such capabilities are advantageous in fighting large fires with limited supply of water. The incorporation of water absorbing materials, in particular, will further improve the effectiveness of the process as the evaporation of water will be slowed down and nearly none of the water will be wasted. Once the flame is extinguished, the spread of fire will be arrested and cooling can begin. Bush and forest fires are examples of situations in which this invention will be useful.

The pulsed fluid-jet process of this invention has many applications other than fighting fires. A pulsed waterjet can find applications in display fountains and is particularly aesthetically pleasant if optical or laser light is incorporated to illuminate it at night. An acoustic effect of a powerful pulsed waterjet and the ability of this process in programming the pulsejet generation are other advantages in fountain applications. A high-power pulsed waterjet can be useful in many concrete demolition work and in mining/tunneling applications, even under submerged conditions. The process of this invention is also useful in many agricultural applications. For example, capsule 400 can contain seeds, plant nutrients, and water absorbents, and be delivered over a distance by pulsed waterjets. The water can be absorbed into capsule 400 and be used by seeds for germination. Such remote seeding process can be very beneficial in land reclamation and desert control. Even seedlings can be delivered over a distance and planted into ground by this process using a specially designed double-barreled capsule in which one barrel is for the seedling and the other barrel is for water and nutrients. A hand-held apparatus of this invention can be useful in such seedling planting operation.

What is claimed is:

1. An instant on-off valve comprising:
   a valve body having a main valve chamber and an actuating chamber separated by a partition;
   a valve plunger straddling the partition, the valve plunger having a tapered front end portion positioned within the main valve chamber and a rear end portion positioned within the actuating chamber, the valve plunger having a central through fluid passage extending from the front end portion to the rear end portion;
   a valve seat positioned at a chamber end of the main valve chamber, the valve seat having a central tapered valve port sealably mating with the front end portion of the valve plunger;
   an actuating pin aligned with the valve plunger, the actuating pin having a first pin end portion positioned within the actuating chamber and a second pin end portion positioned outside the actuating chamber, the second pin end portion connected to an actuator which is attached with respect to the valve body;
   a fluid inlet of the valve body in communication with the main valve chamber and with a fluid passage of an energy storage device;
   a fluid outlet of the valve body in communication with the valve port;
   a nozzle in communication with the fluid outlet; and
   a check valve assembly mounted within the central through fluid passage preventing fluid flow in a direction from the front end portion to the rear end portion of the valve plunger.

2. The instant on-off valve of claim 1 wherein the valve plunger has a side fluid passage forming communication between the fluid inlet and the actuating chamber.

3. The instant on-off valve of claim 2 wherein at least one seal is mounted about the actuating pin to form a fluid-tight seal of the actuating chamber.

4. The instant on-off valve of claim 2 wherein a portion of the central through fluid passage which is positioned within the actuating chamber sealably mates with the first pin end of the actuating pin.

5. The instant on-off valve of claim 1 wherein in a normally closed position the front end portion of the valve plunger sealably contacts the valve port and the rear end portion of the valve plunger sealably contacts the actuating pin to seal the central through fluid passage of the valve plunger.

6. The instant on-off valve of claim 1 further comprising a valve actuator receiving a command signal and applying a force to retract the actuating pin and open the central through fluid passage of the valve plunger.

7. The instant on-off valve of claim 6 wherein the valve actuator is manually operated and comprises a lever trigger, at least one compression spring and a second sliding piston.

8. The instant on-off valve of claim 6 wherein the valve actuator is of an electrical solenoid.

9. The instant on-off valve of claim 1 wherein the nozzle is a fluid-jet nozzle capable of generating at least one high-speed fluid-jet having a predetermined jet pattern.

10. The instant on-off valve of claim 9 wherein the fluid-jet nozzle has an attachment for introducing additives into a nozzle chamber of the fluid-jet nozzle and the introduced additives are discharged from the nozzle by the fluid-jet.

11. The instant on-off valve of claim 10 wherein the additives are introduced into the fluid-jet nozzle by a vacuum generated by the fluid-jet.

12. The instant on-off valve of claim 10 wherein the additives are introduced into the nozzle by one of gravity and an externally applied pressure.

13. The instant on-off valve of claim 10 wherein the additive is one of a liquid, an emulsion, a colloid, a foam, a suspension, a slurry, a soft gel, and a solid in a form of one of a powder, a pellet, a plurality of chopped fibers, and a plurality of granules.

14. The instant on-off valve of claim 10 wherein the additive is one of water soluble, water mixable, water absorbent, and contains materials capable of altering Theological and flow characteristics of water.

15. The instant on-off valve of claim 10 wherein the additive is a solid that contains a material classified as a fire retardant.

16. The instant on-off valve of claim 9 wherein the nozzle has an attachment for introducing an object into the nozzle chamber and the object is propelled out of the nozzle by the fluid-jet.

17. The instant on-off valve of claim 16 wherein the object is a special-effect device.

18. The instant on-off valve of claim 9 wherein the nozzle has an attachment for attaching an object outside the nozzle and the object is propelled away by the fluid-jet.

19. The instant on-off valve of claim 18 wherein the object is a special-effect device.

20. The instant on-off valve of claim 19 wherein the object is one of breakable and has a release mechanism for releasing contents of the object upon at least one of impact and heating.

21. The instant on-off valve of claim 1 further comprising an accumulator comprising:
   a gas cylinder having a cylindrical bore;
   a piston slidably mounted within the cylindrical bore, the piston having at least one seal dividing an interior of the gas cylinder into a gas chamber and a fluid chamber;
   the gas chamber pressurized to a prescribed pressure; and
   the fluid chamber in communication with a discharge of the energy storage device.

22. The energy storage apparatus of claim 21 further comprising:
   a fluid cylinder, a plunger mounted within the fluid cylinder, the plunger having one end attached to the piston and an other end extending through the fluid chamber and into the fluid cylinder; and
   a plunger seal mounted about the plunger and reducing pressurized fluid leakage from the fluid cylinder to the gas cylinder.

23. The energy storage apparatus of claim 21 further comprising at least one sensor mounted with respect to the fluid cylinder and detecting a position of the piston and emitting an electrical signal to a controller operating the actuator of the on-off valve.

* * * * *